(12) United States Patent
Natanzon

(10) Patent No.: US 12,197,288 B2
(45) Date of Patent: Jan. 14, 2025

(54) METHODS AND SYSTEM FOR DATA BACKUP AND RESTORE BASED ON DETECTED OPERATIONS EXECUTING CHANGES IN A HOST FILE SYSTEM

(71) Applicant: HUAWEI TECHNOLOGIES CO., LTD., Shenzhen (CN)

(72) Inventor: Assaf Natanzon, Hod Hasharon (IL)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/983,176

(22) Filed: Nov. 8, 2022

(65) Prior Publication Data

US 2023/0060638 A1 Mar. 2, 2023

Related U.S. Application Data

(63) Continuation of application No. PCT/EP2020/062812, filed on May 8, 2020.

(51) Int. Cl.
| | |
|---|---|
| *G06F 16/00* | (2019.01) |
| *G06F 11/14* | (2006.01) |
| *G06F 16/11* | (2019.01) |
| *G06F 16/16* | (2019.01) |

(52) U.S. Cl.
CPC ...... *G06F 11/1451* (2013.01); *G06F 11/1469* (2013.01); *G06F 16/122* (2019.01); *G06F 16/162* (2019.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 7,464,234 | B1* | 12/2008 | Stringham | G06F 11/1451 |
| | | | | 711/161 |
| 8,676,763 | B2* | 3/2014 | Goodman | G06F 11/1451 |
| | | | | 707/654 |
| 9,575,848 | B2* | 2/2017 | Goodman | G06F 11/1461 |
| 9,772,910 | B1* | 9/2017 | Wigmore | G06F 11/1469 |
| 10,229,125 | B2* | 3/2019 | Goodman | G06F 16/122 |
| 10,567,500 | B1* | 2/2020 | Leshinsky | H04L 67/1097 |
| 11,153,380 | B2* | 10/2021 | Leshinsky | G06F 11/1456 |

(Continued)

FOREIGN PATENT DOCUMENTS

EP 0899662 A1 3/1999

*Primary Examiner* — Farhan M Syed
(74) *Attorney, Agent, or Firm* — Leydig, Voit & Mayer, Ltd.

(57) ABSTRACT

A method backs up data items stored in a host device. The method includes activating a backup agent in a host file system of the host device, the host file system including one or more data items to be backed up. The method includes using the activated backup agent for detecting one or more first operations executing one or more changes in the host file system; detecting the one or more changes in the host file system executed by the one or more first operations; and generating a first data backup instruction based on the detected one or more operations and on the detected one or more changes. The method further includes providing one or more operation algorithms to a backup system and providing the generated first data backup instruction to the backup system configured for delayed backup computation of the one or more data items.

16 Claims, 7 Drawing Sheets

(56) References Cited

U.S. PATENT DOCUMENTS

| | | | |
|---|---|---|---|
| 11,513,907 B2* | 11/2022 | Upadhyay | G06F 16/162 |
| 2006/0129799 A1* | 6/2006 | Wu | G06F 11/1451 |
| | | | 713/100 |
| 2007/0150679 A1* | 6/2007 | Feinberg | G06F 11/1451 |
| | | | 711/162 |
| 2012/0078852 A1* | 3/2012 | Haselton | H04L 47/29 |
| | | | 707/654 |
| 2012/0203742 A1* | 8/2012 | Goodman | G06F 16/128 |
| | | | 707/649 |
| 2013/0339298 A1* | 12/2013 | Muller | G06F 16/1748 |
| | | | 707/640 |
| 2014/0149791 A1* | 5/2014 | Goodman | G06F 16/122 |
| | | | 714/15 |
| 2014/0258236 A1* | 9/2014 | Vijayan | G06F 16/116 |
| | | | 707/674 |
| 2015/0074057 A1* | 3/2015 | Brown | H04L 63/308 |
| | | | 707/644 |
| 2020/0186602 A1* | 6/2020 | Leshinsky | G06F 11/2058 |
| 2021/0240574 A1* | 8/2021 | Upadhyay | G06F 16/162 |

* cited by examiner

METHODS AND SYSTEM FOR DATA BACKUP AND RESTORE BASED ON DETECTED OPERATIONS EXECUTING CHANGES IN A HOST FILE SYSTEM

CROSS-REFERENCE TO RELATED APPLICATIONS

This application is a continuation of International Application No. PCT/EP2020/062812, filed on May 8, 2020. The disclosure of the aforementioned application is hereby incorporated by reference in its entirety.

FIELD

The present disclosure relates generally to the field of data protection and backup, and more specifically, to methods and systems for data backup and restore.

BACKGROUND

Typically, data backup and restore refers to a process of creating and storing copies of data that may be used to protect data and recover such data in an event of data loss in a primary storage system (e.g. a conventional host device). Examples of the event of data loss may include, but is not limited to, data corruption, hardware or software failure in the primary storage system, accidental deletion of data, hacking, or malicious attack. Thus, for safety reasons, a secondary and separate storage system, such as a backup system, is extensively used to store a backup of the data present in the primary storage system.

Currently, conventional backup systems usually employ backup servers either to read data changes from storage systems (e.g. the primary storage system) where data is stored or acquire data directly from a storage of a host device. Some conventional backup systems store the entire changed data. As a result, with time, storage space of the backup systems become occupied as the changed data occupy a large storage space in the conventional backup systems. This is undesirable as it causes reductions in performance of the backup systems. Moreover, the cost of file storage, with all the associated costs including cost of storage hardware, continues to be a burden. Thus, it is still a technical problem of how to reduce data in a backup system.

Currently, there are many techniques that may be employed for data reduction, for example, data compression, data deduplication, and delta differentials. However, the inventors of the present disclosure have recognized that such conventional techniques are inefficient and usually involve reducing the amount of data to be stored by eliminating redundant data. For example, the data deduplication technique is widely used and involves storing data in the backup system in the form of data chunks. Upon receiving new data chunks, a conventional backup server compares the new data chunks with the pre-stored data chunks. If the new data chunks are found to be already stored on the backup server (or backup repository), in that case, a reference to the already stored data chunks is stored. In this way, the data deduplication techniques overcome duplicating the same data in the backup storage space. However, in the conventional techniques, there is no substantial reduction in the amount of data to be stored in the conventional backup system. Moreover, such techniques fail to track or detect any event that makes significant changes to the content of the data. In an example, if a user decides to archive a set of files into a zip file, the data after the compression is completely different than the data before the compression, and thus deduplication will not do any data reduction. In another example, if a user encrypts a file or encrypts the full storage disk, conventional systems usually treat the output files as new data (or changed data) to be backed up, resulting in inefficient data backup and restore processes and systems.

Therefore, in light of the foregoing discussion, the present inventors have recognized that there exists a need to overcome the aforementioned drawbacks associated with conventional data backup and restore processes and systems.

SUMMARY

The present disclosure provides methods and systems for data backup and restore. The present disclosure provides a solution to the existing problem of inefficient data storage that is how to further reduce data in a backup system as compared to conventional methods and systems. The present disclosure provides a solution that overcomes at least partially the problems encountered in prior art, and provides improved methods and systems that enable an efficient data storage (i.e. an efficient data backup and restore).

In a first aspect, the present disclosure provides a method for backing up a data item stored in a host device. The method comprises activating at least one backup agent in a host file system of the host device, the host file system comprising at least one data item to be backed up. The method further comprises using the at least one activated backup agent for: detecting one or more first operations executing one or more changes in the host file system, detecting the one or more first changes in the host file system executed by the one or more first operations, and generating a first data backup instruction based on the detected one or more first operations and on the detected one or more first changes. The method further comprises providing one or more operation algorithms to a backup system; and providing the generated first data backup instruction to the backup system configured for delayed backup computation of the one or more data items to be backed up.

The method of the first aspect provides a substantial reduction in a size of backup data that results in an efficient data storage, for example, in the backup system. In conventional methods, either one or more data items at a conventional host device is backed up as such in a conventional backup system or changes to the one or more data items are backed up, for example, as new data chunks. In contradiction to conventional methods, instead of storing the one or more data items having one or more changes detected therein, beneficially, only instructions (e.g. the generated first data backup instruction) are backed up in the backup system that is configured for delayed backup computation of the one or more data items to be backed up. As a result, there is substantial reduction in the amount of data required to be stored in the backup system.

In an implementation form of the first aspect, the method further comprises detecting one or more second operations sequential to the first operations executing one or more second changes in the host file system; detecting the one or more second changes sequential to the first changes in the host file system executed by the one or more second operations; generating a second data backup instruction based on the detected one or more second operations and on the detected one or more second changes; and storing the generated second data backup instruction in a backup system.

As a result of the use of the backup agent, any changes in the host file system, such as the one or more second operations sequential to the first operations, are accurately and consistently detected. Moreover, the storing of the generated second data backup instruction in the backup system instead of actual data items or changes itself, enables efficient utilization of storage space in the backup system.

In another implementation form of the first aspect, detecting the one or more changes in the host file system comprises detecting at least one of: a change in the one or more data items, one or more new data items in the host file system, a change of a location of one or more data items in the host file system, or a deletion of one or more data items.

As a result of the detection of the one or more changes in the host file system, the backup system stores one or more data backup instructions instead of storing the one or more data items having the one or more changes as in conventional backup systems. Thus, there is efficient usage of storage space of the backup system.

In another implementation form of the first aspect, the one or more data backup instructions comprise a restore point and at least one of: an information of the data item and information related to the change in the data item, an information of creating the new data item, a type of software and version of the software carried out the operation in the host file system related to the change in the data item or creation of the new data item, information regarding what operation algorithms were used in the host file system to carry out the operation, one or more parameters of the used operation algorithms, a type of changes made in the host file system, a key for the encryption, one or more patch files, or an instruction for installing the patch files.

By use of the restore point, and other information, such as a type of software and version of the software, the backup computations can be delayed until the restore point. As a result, there is no need to store the one or more data items having one or more changes, and instead the one or more data backup instructions enables the backup system to recover the one or more data items having the changes at the time of restore (i.e. the restore point). This enables significant reduction of storage space in the backup system.

In another implementation form of the first aspect, the information of the data item comprises at least one of a fact that the data item was changed, a type of the data item, a location of the data item, a name of the data item, or a format of the data.

The information of the data item, such as the fact that data item was changed, location and name of data item etc., provides information to the backup system for identifying the data items having the one or more changes. As a result, the delayed backup computation can be executed by the backup system accurately and efficiently.

In another implementation form of the first aspect, the information of the new data item comprises at least one of: a fact that the new data item was created, a type of the new data item, a location of the new data item, a name of the new data item, or a format of the new data item.

The information of the new data item, such as the fact that the new data item was created, location and name of the new data item, provides information to the backup system for identifying further the new data items that are created. As a result, the delayed backup computation can be executed by the backup system accurately and efficiently using this information about the new data item.

In another implementation form of the first aspect, the detecting is performed by generating a snapshot of the host file system and the one or more data backup instructions are generated by obtaining the one or more data backup instructions from the snapshot.

The snapshot of the host file system enables to detect what changed and further facilitates in generating the one or more data backup instructions accurately. Such data backup instructions are used for performing delayed backup computation for restoring the data item, thereby significantly saving computational resources and storage space during the backup process.

In another implementation form of the first aspect, providing the one or more operation algorithms comprises providing an algorithm for performing the change in the one or more data items, an algorithm for creating the one or more new data items in the host file system, an algorithm for performing the change of the location of one or more data items in the host file system, or an algorithm for the deletion of one or more data items.

The different operation algorithms enable the backup system, at the restore point, to use a specific algorithm to precisely restore a specific data item using the one or more data backup instructions.

In another implementation form of the first aspect, providing the one or more operation algorithms comprises providing a compression algorithm, an encryption algorithm, an editing algorithm, or an installing algorithm.

The knowledge of the use of a specific operation algorithm that was used to create the change in a data item in the host device can be later employed to accurately restore a corresponding data item using the one or more operation algorithms.

In a second aspect, the present disclosure provides a method for backing up a data item of a host device, wherein the method comprises receiving one or more data backup instructions related to a host file system of the host device, the host file system comprising at least one data item to be backed up, storing the received one or more data backup instructions in a backup system; obtaining one or more operation algorithms of the host device and storing the obtained one or more operation algorithms as one or more restore algorithms; and using at least one data backup instruction of the stored one or more data backup instructions and the one or more restore algorithms to perform delayed backup computation of the data item to be backed up.

The method of the second aspect provides a substantial reduction in a size of backup data to be stored in the backup system resulting in an efficient and cost-effective data storage. In comparison to conventional methods, instead of storing the data item having one or more changes, beneficially, the method enables back up of the one or more data backup instructions, which occupies significantly less storage space in the backup system as compared to storing the data item. As a result, there is substantial reduction in the amount of data required to be stored in the backup system.

In an implementation form of the second aspect, the method further comprises preparing a backup database, wherein the prepared backup database comprises a list of data items stored in the host file system, and a pointer of the location of each data item in the host file system, or a data backup instruction for each data item in the list of data items stored in the file system.

The backup database is able to store only the information associated with implementing (or recovering) the one or more changes in the data item instead of storing the data item itself. As a result, a substantial amount of storage space is saved in the backup database.

In a third aspect, the present disclosure provides a method for restoring a data item, wherein the method comprises receiving from a host device at a restore time a restore request comprising a restore point to restore one or more data items being backed up; identifying from a backup database a data backup instruction corresponding to the received restore request; initiating at least one restore algorithm according to the restore request; executing a delayed backup computation by using the identified data backup instruction and the at least one initiated restore algorithm to restore the one or more data items backed up; and providing the restored one or more data items to the host device.

The method of the third aspect, upon receiving the restore request, can be configured to initiate the restore algorithm using the data backup instruction to restore the one or more data items. The restoration is implemented without a prior requirement of storing the one or more data items having the one or more changes. By virtue of which, there is a substantial amount of storage space saved in the backup system due to the delayed backup computation.

In a fourth aspect, the present disclosure provides a system for data backup and restore, wherein the system comprises a backup database and a backup server, wherein the backup server is configured to obtain one or more operation algorithms from a host device and storing the obtained one or more operation algorithms as a restore algorithms; receive one or more data backup instructions from a host file system to be backed up; and to initiate a delayed backup computation of the one or more data items to be backed up.

The backup server (i.e. the backup system) can be configured to store only the one or more operation algorithms and one or more data backup instructions instead of storing the one or more changes in the one or more data items or the data items itself. As a result, a significantly reduced amount of memory space is used in the backup server in comparison to conventional backup servers.

In an implementation form of the fourth aspect, the backup server is further configured to, at a restore time, receive a restore request comprising a restore point; at the restore time, restore the one or more data items of the host file system being backed up according to the received restore point by using a delayed backup computation of the one or more data items to be backed up; and provide the created one or more data items of the host file system being backed up to the host file system as a restored one or more data items.

The backup server can accurately restore the one or more data items at the restore time by using the one or more operation algorithms and one or more data backup instructions to create the one or more data items requested in the restore request. Moreover, a substantial amount of memory space is saved by storing the one or more data backup instructions.

In another implementation form of the fourth aspect, the backup database comprises a list of data items stored in the host file system and a pointer where a data item of the list of data items is located in the host file system or a data backup instruction for each data item in the list of data items stored in the file system.

The backup database can store the information such as the list of data items and the pointer, to accurately create the one or more data items and provide the restored one or more data items to the host device.

In another implementation form of the fourth aspect, the system is further comprising one or more backup agents in the host device.

The one or more backup agents can be used for detecting one or more changes and one or more operation algorithms executing one or more changes in the one or more data items. This results in accurate and efficient restoring of one or more data items.

In another implementation form of the fourth aspect, the one or more backup agents is configured to detect one or more operations executing one or more changes in the host file system; detect the one or more changes in the host file system executed by the one or more operations; and generate the data backup instruction based on the detected one or more operations and on the detected one or more change.

The data backup instruction generated by one or more backup agents can enable memory efficiency and accurate restoring of one or more data items when required by using only the one or more data backup instructions and one or more operation algorithms.

In a fifth aspect, the present disclosure provides a computer program adapted to perform the method of the first aspect when executed on a host file system.

The fifth aspect achieves all the advantages and effects of the first aspect.

In a sixth aspect, the present disclosure provides a computer program adapted to perform the method of the second aspect when executed on a backup system.

The sixth aspect achieves all the advantages and effects of the second aspect.

In a seventh aspect, the present disclosure provides a computer program adapted to perform the method of the third aspect when executed on a host file system.

The seventh aspect achieves all the advantages and effects of the third aspect.

All devices, elements, circuitry, units and means described in the present disclosure could be implemented in the software or hardware elements or any kind of combination thereof. All steps which are performed by the various entities described in the present disclosure as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
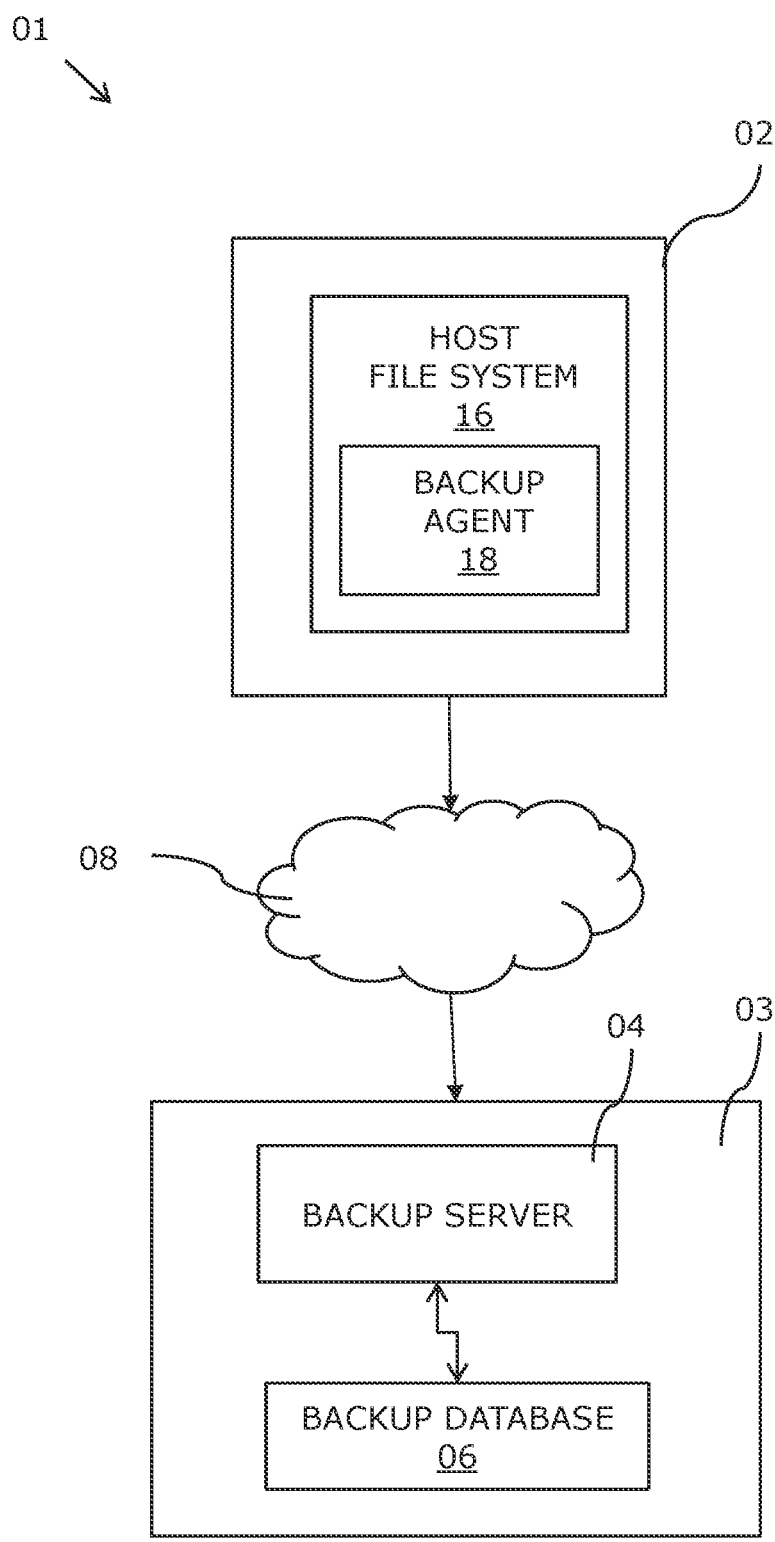
FIG. 1 shows a schematic diagram illustrating an exemplary architecture of a system in accordance with implementations of the present disclosure.

FIG. 1 illustrates an example architecture of a system 01 in accordance with implementations of the present disclosure. In the illustrated example, the example architecture of the system 01 comprises a backup system 03 and a backup agent 18 provided to a host file system 16 of a host device 02, wherein the backup system 03 is configured to communicate over the communication network 08 with the backup agent 18 in the host file system 16 of the host device 02, wherein the host file system 16 comprises at least one data item to be backed up in the backup system 03. The backup system 03 comprises a backup server 04 and a backup database 06.

Figure 2:
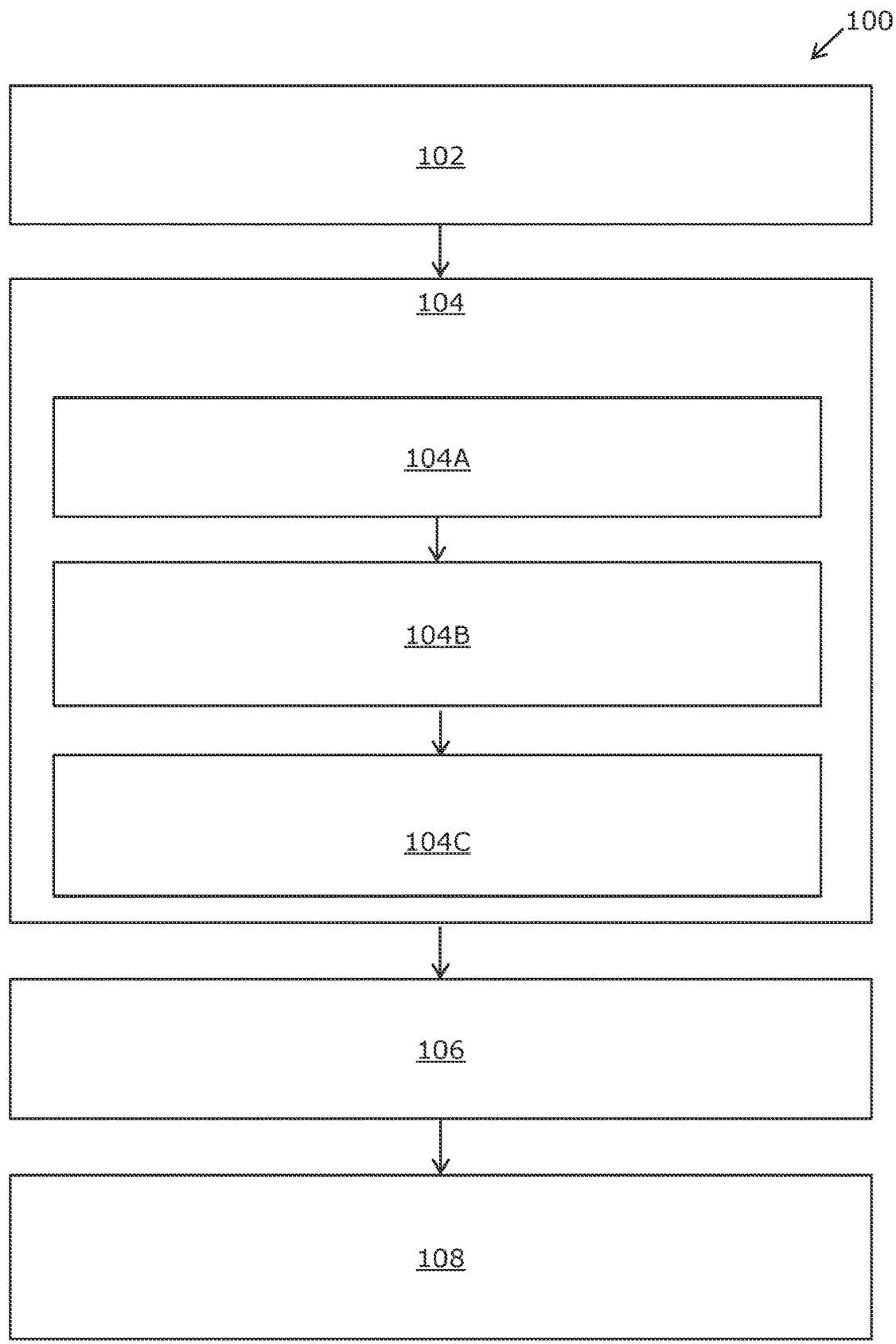
FIG. 2 is a flowchart of a method for backing up a data item stored in a host device, in accordance with an embodiment of the present disclosure.

FIG. 2 illustrates a method 100 for backing up a data item stored in a host device, in accordance with an embodiment of the present disclosure. The method 100 is executed at a host device described, for example, in FIG. 5B. According to the embodiment of the present disclosure, the method 100 for backing up a data item stored in a host device 02 comprises:

activating at least one backup agent 18 in a host file system 16 of the host device 02, the host file system 16 comprising at least one data item to be backed up;

using the at least one activated backup agent 18 for detecting one or more first operations executing one or more first changes in the host file system 16;

detecting the one or more first changes in the host file system 16 executed by the one or more first operations;

generating a first data backup instruction based on the detected one or more first operations and on the detected one or more first changes;

providing one or more operation algorithms to a backup system; and providing the generated first data backup instruction to the backup system configured for delayed backup computation of the one or more data items to be backed up.

With reference to the FIG. 2 illustrating the embodiment of the method 100, the method comprises at step 102, activating at least one backup agent in a host file system of the host device. The host file system comprises at least one data item to be backed up. The activating of the backup agent refers to operationalizing the backup agent in the host device. In an example, the at least one backup agent is first installed on the host device, which is then activated (i.e. operationalized) so that the at least one backup agent executes its function. The backup agent refers to a software implemented on the host device that is configured to access data items (i.e. data files, data folders and the like) and is configured to perform functions associated with backup and restore. Moreover, the backup agent also acts as a communication agent or interface between the host device and the backup system. The backup agent on activation provides information to the backup system which enables the backup system to perform the backup and restore functions when required. At the time of installation of the backup agent, the backup agent is integrated with several software algorithms in the host device to enable it to perform its function, such as detection of changes, caused by such software algorithms accurately. Examples of software algorithms include but are not limited to a compression algorithm, an encryption algorithm, a video editing algorithm, and the like. Moreover, the host file system refers to a file system of the host device and is associated with the process of managing the data items in the host device. For example, the process of managing the data items may include, but is not limited to, naming of data items in the host device, storing of data item in host device, associating a location with the data items in the host device, and the like. Typically, the host file system includes one or more data items. Examples of the one or more data items include, but are not limited to an audio, a video, an image, a folder, a text document, or other files, such as a zip file.

At step 104, the method comprises using the at least one activated backup agent for executing several sub-steps 104A, 104B, and 104C of the step 104 at the host device. At the sub-step 104A, the method further comprises using the at least one activated backup agent for detecting one or more first operations executing one or more first changes in the host file system. Typically, the one or more first operations are the operations which cause large scale changes in the host file system (e.g. changes in one or more data items or a storage of the host file system). The detected one or more first operations are executed by at least one operation algorithm to produce the one or more first changes in the data item present in the host file system of the host device. In an example, the one or more first changes may be a change in size of the data item caused by operation algorithm (e.g. a change caused by compression), a change in appearance of the data item (e.g. caused by filtering or other visual changes causing algorithms), a change in security associated with the data item (e.g. due to encryption operation or a zipping operation), a change in format of the data item, and the like.

At step 104B on FIG. 2, the method further comprises using the at least one activated backup agent for detecting the one or more first changes in the host file system executed by the one or more first operations. The at least one backup agent is configured to detect the one or more first changes by identifying changes executed by, for example, compression, encryption, filtering, and other operations. In an example, a data item that is compressed and archived into a zipped data item is different from the data item before compression. The zipped data item has a reduced size in comparison to the data item before compression. Therefore, in the example, the one or more first changes are in terms of the size of the data item in the host file system of the host device executed by the operation of compression algorithm. In another example, a data item that is encrypted into an encrypted data item is different from the data item before encryption. The encrypted data item is more secure in comparison to the data item before encryption. As a result, the one or more first changes are in terms of security of the data item in the host file system of the host device. In yet another example, a data item such as an image is changed into a filtered image by applying filters, where the filtered image is different in appearance from the image before applying filter. As a result, the one or more first changes are in terms of appearance of the data item in the host file system of the host device.

At step 104C of FIG. 2, the method further comprises using the at least one activated backup agent for generating a first data backup instruction based on the detected one or more first operations and on the detected one or more first changes. The first data backup instruction indicates a sequence of steps that are required to be executed to reproduce the one or more first changes in the one or more data items present in the host file system. In an example, the sequence of steps are potentially an ordered sequence of steps. For example, the first data backup instruction includes steps that are to be executed in order to reproduce a zipped folder based on a detected operation of compression (e.g. by zipping operation) executed on the one or more data items together for zipping and detected changes caused by the compression of the one or more data item. In another example, the first data backup instruction includes steps that are to be executed to reproduce an encrypted data item based on a detected operation of encryption executed on data item and detected change upon encryption of the data item.

At step 106, the method comprises providing one or more operation algorithms to the backup system. The backup system is used to store backup of data present in the host device. In the backup system, instead of storing actual data items during backup, the one or more operation algorithms and backup instructions (e.g. the first data backup instruction) are stored, which are later used to reproduce corresponding data items of the host device. As an example, the backup system comprises a backup server 04, described in detail, for example, in the FIG. 5C. Examples of the one or more operation algorithms, include but are not limited to, a compression algorithm, an encryption algorithm, a video editing algorithm, a patch file, an installation software file, other software algorithms, or software components present in the host device, which are usually employed to perform operations on the one or more data items leading to changes in the one or more data items. In an example, a data item may be compressed and archived into a zipped data item by use of the compression algorithm. In another example, a data item may be encrypted into another data item by use of the encryption algorithm. In yet another example, at least one image may be changed into another image by the user of filters of the video editing algorithm. In yet another example, a patch (i.e. a software patch) may be installed in a virtual machine of the host device by the patch file. Such operation algorithms cause one or more first changes in the host file system. In an example, the providing (i.e. storing) of the one or more operation algorithms to the backup system is potentially a one-time activity, for example, performed when the one or more first changes are detected. In another example, the providing of the one or more operation algorithms is potentially a periodic activity executed from time to time as and when any new update to existing list of operation algorithms or any new operation algorithm is detected in the host device using the at least one backup agent.

At step 108, the method comprises providing the generating first data backup instruction to the backup system configured for delayed backup computation of the one or more data items to be backed up. The generated first data backup instruction is provided to the backup system instead of actual data items (i.e. the one or more data items) to be backed up. The generated first data backup instruction is used by the backup system to perform computation for reproducing the one or more data items having one or more changes at a delayed time (i.e. during restore time). In other words, the delayed backup computation is performed at the restore time. In an example, the restore time may be a user-selected restore time, which is set based on a user input. Thus, the need for backing up the one or more data items which have one or more changes implemented thereupon during backup is eliminated, thereby resulting in an efficient storage, which takes less storage space in the backup system as compared to conventional methods.

In accordance with an embodiment, the method 100 further comprises detecting one or more second operations sequential to the first operations executing one or more second changes in the host file system; detecting the one or more second changes sequential to the first changes in the host file system executed by the one or more second operations; generating a second data backup instruction based on the detected one or more second operations and on the detected one or more second changes; and storing the generated second data backup instruction in a backup system. Similar to detection of the one or more first changes and generation of the first data backup instruction, the one or more second operations are detected and the second data backup instruction is generated. In an example, as the one or more operation algorithms are already provided to the backup system previously (e.g. in step 106), it may not be required to again provide the one or more operation algorithms. It is to be understood that the method 100 may further comprise detecting one or more third operations sequential to the second operations executing one or more third changes in the host file system. Further, the method 100 may further comprise detecting one or more fourth operations, fifth operation, sixth operations, and so on. As a result of the use of the backup agent, any changes in the host file system, such as the one or more second operations sequential to the first operations, are accurately and consistently detected. Moreover, the storing of the generated second data backup instruction in the backup system instead of actual data items or changes itself, enables efficient utilization of storage space in the backup system.

In accordance with an embodiment, the method 100 further comprises detecting the one or more change in the host file system comprises detecting at least one of: a change in the one or more data items, one or more new data items in the host file system, a change of a location of one or more data items in the host file system, or a deletion of one or more data items. The change in the one or more data items may be intra-change, that is any change associated with files itself. For example, the change due to encrypting of a data item, compression of the data item by zipping operation, and the like. In an example, the one or more new data items refer to data items that are newly generated by the operation algorithms. The one or more new data items are different from the one or more data items that are prestored and changed by the operation algorithms. Moreover, the location of one or more data items in the host file system may be changed from a first location to a second location. In an example, a data item in the C drive may have the location changed to D drive, which refers to the change of the location of one or more data items. Furthermore, the one or more data items on the host file system may be deleted (e.g. upon completion of a task associated with the one or more data items). In another example, a data item may be accidently deleted by a user of the host device. In an example, the aforementioned one or more changes in the host file system may result in large scale changes in the one or more data items.

In accordance with an embodiment, the one or more data backup instructions comprise a restore point and at least one of: an information of the data item and information related to the change in the data item, an information of creating the new data item, a type of software and version of the software carried out the operation in the host file system related to the change in the data item or creation of the new data item, information regarding what operation algorithms were used in the host file system to carry out the operation, one or more parameters of the used operation algorithms, a type of changes made in the host file system, a key for the encryption, one or more patch files, or instructions for installing the patch files. In an example, the term restore point herein corresponds to a time when the restore is set to occur. Additionally, the restore point also refers to a state of the one or more data items in the host file system, which can be restored when required, for example, using the first or the second data backup instruction. In an example, a user may decide and set the restore point based on the type of data item. By use of the restore point, and other information, such as the type of software and version of the software, the backup computations can be delayed till the restore point. As a result, there is no need to store the one or more data items having one or more changes, and instead the one or more data backup instructions enable the backup system to recover the one or more data items having the changes at the time of restore (i.e. the restore point). This enables significant reduction of storage space in the backup system.

In accordance with an embodiment, the information of the data item comprises at least one of: a fact that the data item was changed, a type of the data item, a location of the data item, a name of the data item, or a format of the data item. The information of the data item enables in reproducing the data item, if needed, by knowing the changes in the data item. The type of the data item indicates, for example, a file type, such as an audio, video, document, image, a patch file, and the like. The location of data item indicates where the data item is stored in the host device (e.g. a path pointing to data item may indicate the location), and enables in determining if the location of data item is changed by the one or more first or second operations. The name of the data item indicates a file name to identify the data item and further in determining if a name of the data item is changed by the one or more first or second operations. The format of the data item enables in determining if a format of data item is changed by the one or more first or second operations. Thus, the information of the data item, such as the fact that data item was changed, location and name of data item etc., provides information to the backup system for identifying the data items having the one or more changes. As a result, the delayed backup computation can be executed by the backup system accurately and efficiently.

In accordance with an embodiment, the information of the new data item comprises at least one of a fact that the new data item was created, a type of the new data item, a location of the new data item, a name of the new data item, or a format of the new data item. The information of the new data item enables reproducing the new data item, if needed, by knowing the fact that the new data item was created in the host file system. The type of the new data item indicates file type, such as image, audio, video, document, text, software, etc. The location of the new data item indicates where the new data item (e.g. a new file) is stored in the host device (e.g. a path pointing to new data item may indicate the location). The name and format of the new data item are used when such a new data item is to be restored. Thus, the information of the new data item, such as the fact that the new data item was created, location and name of the new data item, provides information to the backup system for further identifying the new data items that are created. As a result, the delayed backup computation can be executed by the backup system accurately and efficiently using this information about the new data item.

Optionally, the type of software and the version of the software that carried out the operation in the host file system is detected by the backup agent. The type of software may be based on functionality of the software. In an example, a photo editing software carries out the operation of editing the appearance of a data item. As the software is updated regularly, the version of the software is required to be determined. The aforesaid information of the type of software and the version of the software is required by the data backup instructions to reproduce the change in the data item or to reproduce the new data item when required by a user.

Optionally, the information regarding what operation algorithms were used in the host file system to carry out the operation and one or more parameters of the used operation algorithms are detected by the backup agent from the operation algorithms. Optionally, the type of changes made in the host file system are identified by the backup agent based on what parameters or settings were used in the operation algorithms to carry out the operation. Moreover, a key is usually needed for the encryption. Such key is needed to perform the same operation on the source file. Thus, the key for the encryption is provided by the backup agent and is stored as a part of instructions (e.g. in one or more data backup instructions) in the backup database. For example, a file B may be encrypted every day with a different key in the host device. However, the restoring of the file B may be done only once in month, where the encryption is run on the backup system (i.e. a secondary storage) only once in the month, while it was run almost 30 times at the host device (e.g. in production environment), thereby resulting in huge savings in computational resources as well as storage space in the backup system.

In accordance with an embodiment, the method further comprises a step, wherein detecting is performed by generating a snapshot of the host file system and the one or more data backup instructions are generated by obtaining the one or more data backup instructions from the snapshot. The snapshot of the host file system provides information to the backup agent about the data items in the host file system and further information about the data items which have one or more operations executed thereupon. As a result, one or more data backup instructions are generated by the backup agent based on the snapshot. Beneficially, the snapshot of the host file system enables to detect what changed and further facilitates in generating the one or more data backup instructions accurately.

In accordance with an embodiment, the method further comprises a step, wherein providing the one or more operation algorithms comprises providing algorithm for performing the change in the one or more data items, algorithm for creating the one or more new data items in the host file system, algorithm for performing the change of the location of one or more data items in the host file system or algorithm for the deletion of one or more data items. In an example, performing the change in the one or more data items may be the change due to compression, archiving into a zipped folder, editing of data items, and the like. The one or more operation algorithms enable reproducing the one or more changes executed on the one or more data items by the operation algorithm. Similarly, different algorithms that perform specific functions are provided to the backup system. Beneficially, the different operation algorithms enable the backup system, at the restore point, to use a specific algorithm to precisely restore a specific data item using the one or more data backup instructions.

In accordance with an embodiment, the method further comprises a step, wherein providing the one or more operation algorithms comprises providing a compression algorithm, an encryption algorithm, an editing algorithm, or an installing algorithm. It is to be understood that the one or more operation algorithms may include other algorithms, software, or software components that are used in the host file system to carry out a specific operation. Beneficially, the knowledge of the use of a specific operation algorithm that was used to create the change in a data item in the host device is later employed to accurately restore a corresponding data item using the one or more operation algorithms.

Thus, the method 100 provides a substantial reduction in a size of backup data that results in an efficient data storage, for example, in the backup system. In contradiction to conventional methods, instead of storing the one or more data items having one or more changes detected therein, beneficially, only instructions (e.g. the generated first or the second data backup instruction) may be backed up in the backup system that is configured for delayed backup computation of the one or more data items to be backed up. As a result, there is substantial reduction in the amount of data required to be stored in the backup system, which in turn reduces the hardware cost related to storage systems of the backup system.

The steps 102 to 108 are only illustrative and other alternatives can also be provided where one or more steps are added, one or more steps are removed, or one or more steps are provided in a different sequence without departing from the scope of the claims herein.

In one aspect, a computer program is provided, wherein the computer program is adapted to perform the method 100 when executed in a host file system 16 of a host device 02. In an example, the computer program may be stored in a non-transitory computer-readable storage medium having a code of the computer program stored therein, wherein the code of the computer program being executable by a processor 10 to execute the method 100. Examples of implementation of the non-transitory computer-readable storage medium include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or central processing unit (CPU) cache memory. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

Figure 3:
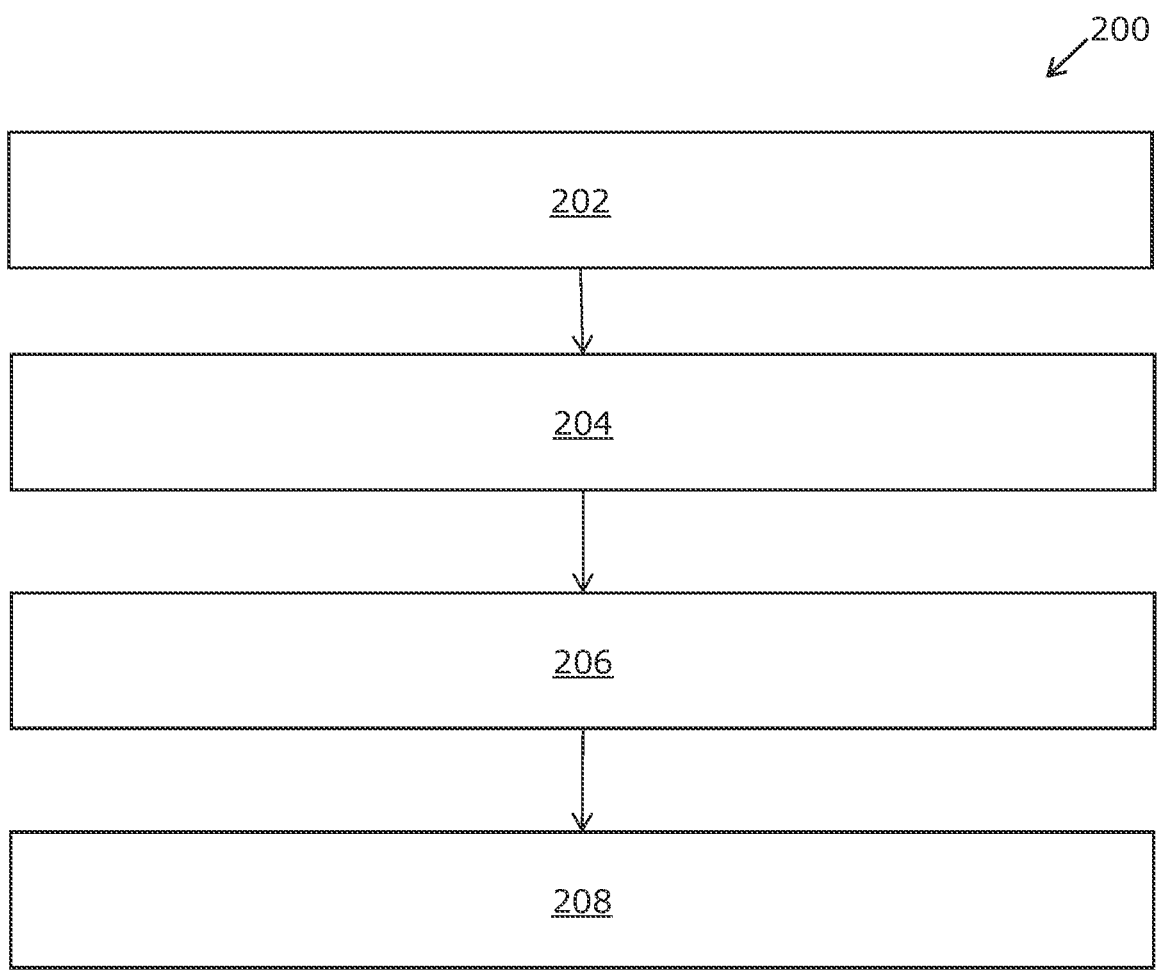
FIG. 3 is a flowchart of a method for backing up a data item of a host device, in accordance with an embodiment of the present disclosure.

FIG. 3 illustrates a method 200 for backing up a data item of a host device, in accordance with an embodiment of the present disclosure. The method 200 is executed at a backup system, for example, the backup system described, for example, in FIG. 5C. According to the embodiment of the present disclosure the method 200 for backing up a data item of a host device 02 comprises receiving one or more data backup instructions related to a host file system 16 of the host device 02, the host file system 16 comprising at least one data item to be backed up;

storing the received one or more data backup instructions in a backup system;

obtaining one or more operation algorithms of the host device 02 and storing the obtained one or more operation algorithms as one or more restore algorithms;

using at least one data backup instruction of the stored one or more data backup instructions and the one or more restore algorithms to perform delayed backup computation of the data item to be backed up.

With reference to the FIG. 3 illustrating the embodiment of the method 200, the method comprises at step 202, receiving one or more data backup instructions related to a host file system 16 of the host device 02. The host file system 16 comprises at least one data item to be backed up. The one or more data backup instructions are received by the backup system (e.g. a backup server) from the host device, via a communication network. The one or more data backup instructions are received instead of actual data items (i.e. one or more data items) to be backed up, which reduces the storage space and increases the storage efficiency of the backup system.

In accordance with an embodiment, the received one or more data backup instructions comprise a restore point and at least one of: the information of the data item and the information related to the change in the data item, the information of creating the new data item, the type of software and version of the software that carried out the operation in the host file system related to the change in the data item or creation of the new data item, the information regarding what operation algorithms were used in the host file system to carry out the operation, the one or more parameters of the used operation algorithms, the type of changes made in the host file system, the key for the encryption, the one or more patch files, and the instructions for installing the patch files. The one or more data backup instructions (such as the first data backup instruction and the second data backup instruction) have been described in detail, for example, in FIG. 2. Beneficially, the restoration is implemented without a prior requirement of storing the one or more data items having the one or more changes. By virtue of which, there is a substantial amount of storage space saved in the backup system due to the delayed backup computation.

At step 204 on FIG. 3, the method comprises storing the received one or more data backup instructions in a backup system. The one or more data backup instructions are stored in the backup system to enable restoration or reproduction of the at least one data item. In an example, the one or more data backup instructions is potentially stored in a backup database of the backup system.

At step 206 on FIG. 3, the method 200 comprises obtaining one or more operation algorithms of the host device 02 are and storing the obtained one or more operation algorithms as one or more restore algorithms. In the backup system, instead of storing actual data items during backup, the one or more operation algorithms and the one or more backup instructions are stored, which are later used (e.g. at restore time) to reproduce corresponding data items of the host device. The one or more operation algorithms are stored as restore algorithms as such algorithms are used to restore corresponding data items at the restore time. Examples of the restore algorithms are same as of the one or more operation algorithms, for example, a compression algorithm, an encryption algorithm, a video editing algorithm, a patch file, an installation software file, software or software components, which are usually employed to perform restore operations.

At step 208 on FIG. 3, the method 200 comprises using at least one data backup instruction of the stored one or more data backup instructions and the one or more restore algorithms to perform delayed backup computation of the data item to be backed up. The delayed backup computation is performed by using the at least one data backup instruction and one or more restore algorithms based on the restore point. In other words, the at least one data backup instruction is used by the backup system to perform computation for reproducing the one or more data items having one or more changes at a delayed time (i.e. during restore time). Thus, the delayed backup computation refers to delaying of any backup computation from the backup time to the restore time. In an example, a user operating a host device may request for restoring a zipped data item. In such a case, the delayed backup computation is executed on one or more data items present in a folder to produce zipped one or more data items to the user.

In accordance with an embodiment, the method further comprises preparing a backup database. The prepared backup database comprises a list of data items stored in the host file system, and a pointer of the location of each data item in the host file system or a data backup instruction for each data item in the list of data items stored in the host file system. Examples of backup database include, but are not limited to a backup catalogue, a table, an Extensible Markup Language (XML) file configured to store data within XML tags, or any form of database used to store information for future reference at the backup system. The backup database is configured to store the one or more data backup instructions related to the host file system and the one or more operation algorithms as restore algorithms. The backup database provides the one or more data backup instructions and one or more operation algorithms to the backup system upon receiving a request for restoring the at least one data item. The list of data items, location of data items, and the data backup instructions enable restoring of the at least one data item at the restore time. In an example, the list of data items potentially includes a name of data item, a data type of the data item, a data size of the data item, and/or a data format of the data item. The pointer of the location is a variable which stores a memory address that refers to respective data item in the host file system. For example, data item A in host device may be pointed by a file path, "D:\folderA\folderBfilename.xxx". Beneficially, the backup database stores only the information associated with implementing (or recovering) the one or more changes in the data item instead of storing the data item itself. As a result, a substantial amount of storage space is saved in the backup database.

Thus, by use of the method 200, a substantial reduction is achieved in a size of backup data to be stored in the backup system resulting in an efficient and cost-effective data storage. In comparison to conventional methods, instead of storing the data item having one or more changes, beneficially, the method 200 enables to back up of the one or more data backup instructions, which occupies significantly less storage space in the backup system as compared to storing the data item. As a result, there is substantial reduction in the amount of data required to be stored in the backup system.

The steps 202 to 208 are only illustrative and other alternatives can also be provided where one or more steps are added, one or more steps are removed, or one or more steps are provided in a different sequence without departing from the scope of the claims herein.

In another aspect, a computer program is provided, wherein the computer program is adapted to perform the method 200 when executed on a backup system 03. In an example, the computer program may be stored in a non-transitory computer-readable storage medium having a code of the computer program stored therein, wherein the code of the computer program being executable by a processor 20 to execute the method 200. Examples of implementation of the non-transitory computer-readable storage medium is the same as described, for example, in FIG. 2 for method 100.

Figure 4:
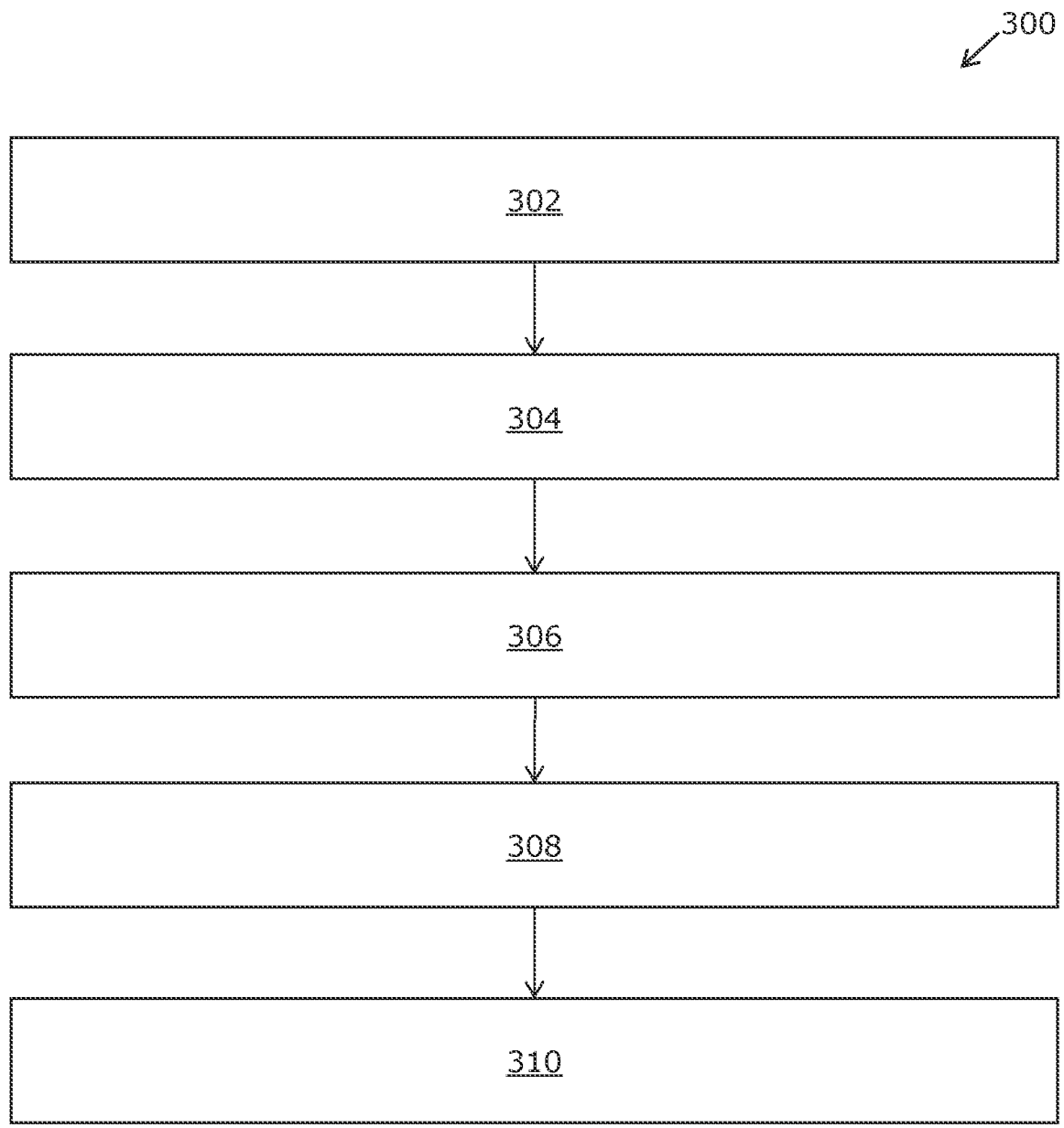
FIG. 4 is a flowchart of a method for restoring a data item, in accordance with an embodiment of the present disclosure.

FIG. 4 illustrates a method 300 for restoring a data item, in accordance with an embodiment of the present disclosure. The method 300 is executed at a backup system described, for example, in FIG. 5C. According to the embodiment of the present disclosure the method 300 for restoring a data item comprises:

receiving from a host device 02 at a restore time a restore request comprising a restore point to restore one or more data items being backed up;

identifying from a backup database 06 a data backup instruction corresponding to the received restore request;

initiating at least one restore algorithm according to the restore request;

executing a delayed backup computation by using the identified data backup instruction and the at least one initiated restore algorithm to restore the one or more data items backed up; and providing the restored one or more data items to the host device 02.

With reference to the FIG. 4 illustrating the embodiment of the method 300, the method comprises at step 302, receiving from a host device 02 at a restore time a restore request comprising a restore point to restore one or more data items being backed up. The restore request is initiated by the host device and received by the backup system. The restore request refers to a request to recover one or more data items at the host device from the backup system. The backup system is configured to receive one or more data backup instructions. The restore time refers to a precise time at which restoring of the one or more data items is to be executed. The restore point of the one or more data items enables the restoring of one or more data items to a desired state.

At step 304 on FIG. 4, the method 300 comprises identifying from a backup database 06 a data backup instruction corresponding to the received restore request. When the restore request is received from the host device at the restore time, the data backup instruction corresponding to the received restore request is identified from the backup database. For example, based on the restore request at the restore time, it may be checked for that particular restore time, which restore operations are to be performed, and which data backup instruction(s) is specified in the backup database to carry out such restore operations. In another example, the list of data items stored in the backup database may also be used to identify the data backup instruction. For instance, a match of a filename of a data item which is received in the restore request with a filename of a data item stored in the list of data items, may indicate corresponding data backup instruction associated with the data item.

In an embodiment it may be also more than the filename of the data item, for example also the time the backups were done and if there are more than one host devices then a host device id of each of the host devices.

At step 306 on FIG. 4, the method 300 comprises initiating at least one restore algorithm according to the restore request. The at least one restore algorithm is executed, to restore the at least one data item, in accordance to the identified data backup instruction. The identified data backup instruction defines a sequence of steps that are required to be executed including the use of the at least one restore algorithm to reproduce one or more first changes in the at least one data item. For example, identified data backup instruction defines the use of a compression algorithm and a pointer that indicates on which data item the compression algorithm is to be applied to in order to reproduce a zipped folder. The restore request in such a case may be to restore the zipped folder.

At step 308 on FIG. 4, the method 300 comprises executing a delayed backup computation by using the identified data backup instruction and the at least one initiated restore algorithm to restore the one or more data items backed up. The identified data backup instruction provides a sequence of steps that are to be executed by using the initiated restore algorithm to reproduce the one or more first changes in the one or more data items to enable restoring of the one or more data items backed up. In an example, the identified data back instruction may be for encryption of one or more data items and the initiated encryption algorithm enables in execution of delayed backup computation to restore the one or more data items by performing encryption at the restore time (e.g. a delayed backup computation of encryption).

At step 310 on FIG. 4, the method 300 comprises providing the restored one or more data items to the host device 02. The restored one or more data items are provided to the host device based on the restore request received from the host device. In an example, the restore request is for receiving zipped one or more data items. In such an example, the backup system executes the delayed backup computation for zipping the data item for restoration and provides the zipped one or more data items to the host device.

Thus, in the method 300, the restoration is implemented without a prior requirement of storing the one or more data items having the one or more changes. By virtue of which, there is a substantial amount of storage space saved in the backup system due to the delayed backup computation.

The steps 302 to 310 are only illustrative and other alternatives can also be provided where one or more steps are added, one or more steps are removed, or one or more steps are provided in a different sequence without departing from the scope of the claims herein.

In yet another aspect, a computer program is provided, wherein the computer program is adapted to perform the method 300 when executed on a host file system 16 of a host device 02. In an example, the computer program may be stored in a non-transitory computer-readable storage medium having a code of the computer program stored therein, wherein the code of the computer program being executable by a processor 10 to execute the method 300. Examples of implementation of the non-transitory computer-readable storage medium is the same as described, for example, in FIG. 2 for method 100.

Figure 5A:
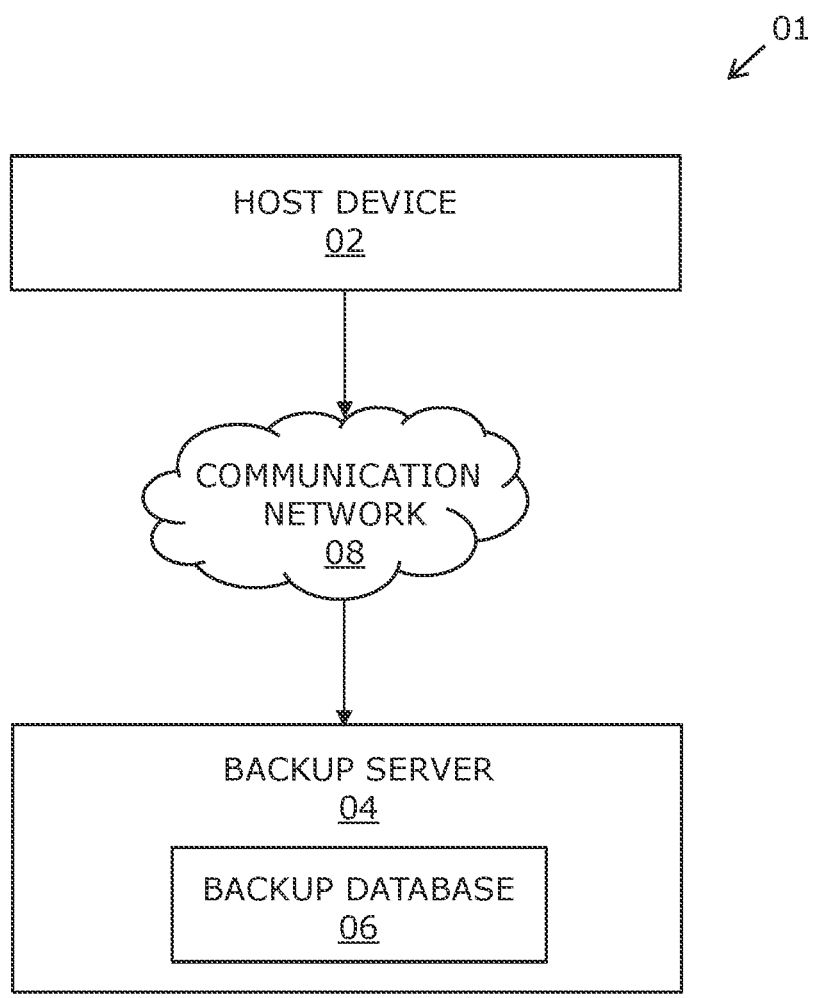
FIG. 5A is a network environment diagram of a system for data backup and restore, in accordance with an embodiment of the present disclosure.

FIG. 5A illustrates an environment diagram of a system 01 for data backup and restore, in accordance with an embodiment of the present disclosure. With reference to FIG. 5A, there is shown a network environment of the system 01 that comprises a host device 02, a backup server 04, and a backup database 06. There is further shown a communication network 08.

The host device 02 comprises a suitable logic, a circuitry, one or more interfaces and a code that is configured to store and process information and one or more data items and to share the information or one or more data items with the backup server 04 via the communication network 08. The host device 02 comprises a host file system comprising one or more data items. The host file system may have one or more operation algorithms implemented on the host device 02. The host device 02 is configured to provide the information such as one or more operation algorithms and one or more data backup instructions to the backup server 04 via a backup agent in the host device 02. Examples of the host device 02 include, but is not limited to a host server, a host production environment system, a thin client connected to the host server, a primary storage system, and user devices (such as cellular phones, personal digital assistants (PDAs), handheld devices, laptop computers, personal computers, an Internet-of-Things (IoT) device, a smart phone, a machine type communication (MTC) device, a computing device, a drone, or any other portable or non-portable electronic device).

The backup server 04 comprises a suitable logic, a circuitry, one or more interfaces and a code that is configured to store, process and receive information or one or more data items from the host device 02 via the communication network 06. Furthermore, it should be appreciated that the backup server 04 may be a single hardware server or plurality of hardware servers operating in a parallel or distributed architecture to form the backup system. Examples of the backup server 04 include, but is not limited to a secondary storage system, a storage server, a cloud server, a web server, an application server, or a combination thereof.

The backup database 06 refers to an organized body of information regardless of the manner in which the information or the organized body thereof is represented. The backup database 06 is configured to store the one or more data backup instructions and the one or more operation algorithms received by the backup server 04. Examples of backup database 06 include, but is not limited to a backup catalogue, a table, an Extensible Markup Language (XML) file configured to store data within XML tags, or any form of database used to store information for future reference at the backup server 04.

The communication network 08 includes a medium (e.g. a communication channel) through which the host device 02 communicates with the backup server 04. The communication network 08 may be a wired or wireless communication network 08. Examples of the communication network 08 may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a cellular network, a plain old telephone service (POTS), a Metropolitan Area Network (MAN), and/or the Internet. The host device 02 and the backup server 04 are potentially configured to connect to the communication network 08, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, IEEE 802.16, Long Term Evolution (LTE), Light Fidelity (Li-Fi), and/or other cellular communication protocols or Bluetooth (BT) communication protocols, including variants thereof.

In an embodiment of the preset disclosure the system for data backup and restore comprises a backup database 06 and a backup server 04, wherein the backup server 04 is configured to:
obtain one or more operation algorithms from a host device 02 and store the obtained one or more operation algorithms as a restore algorithms;
receive one or more data backup instructions from a host file system 16 to be backed up; and
initiate a delayed backup computation of the one or more data items to be backed up.

The backup server 04 is configured to obtain one or more operation algorithms from the host device 02 and store the obtained one or more operation algorithms as a restore algorithms. In the backup system, instead of storing actual data items during backup, the one or more operation algorithms are obtained and stored, which are later used (e.g. at restore time) to reproduce corresponding data items of the host device. The one or more operation algorithms are stored as restore algorithms as these algorithms are used to restore corresponding data items at the restore time. Examples of the restore algorithms are the same as of the one or more operation algorithms, for example, a compression algorithm, an encryption algorithm, a video editing algorithm, a patch file, an installation software file, software or software components, which are usually employed to perform restore operations.

The backup server 04 is further configured to receive one or more data backup instructions from the host file system to be backed up. The host device 02 includes at least one backup agent, which is activated, and the activated at least one backup agent is used for generating the one or more data backup instructions. The one or more data backup instructions are generated based on the one or more operations and one or more changes detected by the at least one backup agent in the host file system. Thus, one or more data backup instructions are obtained by the backup server 04 from the host device, via the communication network 08. The one or more data backup instructions are received instead of actual data items (i.e. one or more data items) to be backed up, which reduces the storage space and increases the storage efficiency of the backup server 04. Beneficially, the backup server 04 is configured to store only the one or more operation algorithms and one or more data backup instructions instead of storing the one or more changes in the one or more data items or the data items itself. As a result, a significantly reduced amount of memory space is used in the backup server 04 in comparison to conventional backup servers.

The backup server 04 is further configured to initiate a delayed backup computation of the one or more data items to be backed up. The delayed backup computation is performed by using the one or more data backup instructions. The backup server 04 executes the one or more data backup instructions to perform computation for reproducing the one or more data items having one or more changes at a delayed time (i.e. during restore time). Thus, the delayed backup computation refers to delaying any backup computation from the backup time to the restore time. The one or more restore algorithms and the one or more data backup instructions received by the backup server 04 enable in performing any computation on the one or more data items for restoring the one or more data items having one or more changes implemented thereupon.

In an embodiment of the present disclosure the system for data backup and restore further comprises a backup server 04, wherein the backup server 04 is further configured to
at a restore time receive a restore request comprising a restore point;
at the restore time to restore the one or more data items of the host file system 16 being backed up according to the received restore point by using a delayed backup computation of the one or more data items to be backed up;
providing the created one or more data items of the host file system 16 being backed up to the host file system 16 as a restored one or more data items.

In accordance with the embodiment, the backup server 04 is further configured to, at the restore time, receive the restore request comprising the restore point. The backup server 04 receives the restore request from the host device 02. In an example, the restore request comprises a restore point to restore one or more data items. The restore request is initiated by the host device 02 and received by the backup server 04 via the communication network 08. The restore request refers to a request received at the restore time to recover one or more data items at the host device 02 from the backup server 04.

In accordance with the embodiment, the backup server 04 is further configured to at the restore time to restore the one or more data items of the host file system being backed up according to the received restore point by using the delayed backup computation of the one or more data items to be backed up to create the one or more data items to be restored. Based on the received restore point, at least one data backup instruction is identified from the backup database 06. For example, based on the restore request at the restore time, it may be checked for that particular restore time, which restore operations are to be performed, and which data backup instruction is specified in the backup database 06 to carry out such restore operation. The at least one data backup instruction is then executed, which also initiates at least one restore algorithm at the restore time to restore the one or more data items of the host file system. Beneficially, the backup server accurately restores the one or more data items at the restore time by using the one or more operation algorithms and one or more data backup instructions to create the one or more data items requested in the restore request. Moreover, a substantial amount of memory space is saved by storing the one or more data backup instructions.

In accordance with the embodiment, the backup server 04 is further configured to provide the created one or more data items of the host file system being backed up to the host file system as a restored one or more data items. The created one or more data items are based on the restore request provided by the host device 02. In an example, the restore request is for receiving an encrypted data item. In such an example, the backup server 04 executes the delayed backup computation for encrypting the data item for restoration and provides the encrypted data item to the host device 02. Thus, a significantly reduced amount of memory space is used in the backup server 04 in comparison to conventional backup servers.

In an embodiment of the present disclosure the system for data backup and restore further comprises a backup database 06 wherein the backup database 06 comprises a list of data items stored in the host file system 16 and a pointer where a data item of the list of data items is located in the host file system 16 or a list of data items stored in the host file system 16 and a data backup instruction for each data item in the list of data items stored in the host file system 16.

In accordance with the embodiment, the backup database 06 comprises the list of data items stored in the host file system. The backup database 06 further includes a pointer where a data item of the list of data items is located in the host file system or a data backup instruction for each data item in the list of data items stored in the host file system. The list and location of data items and the data backup instructions in the backup database 06 enable the restoring of one or more data items at the host device 02 upon receiving the restore request at the backup server 04. In an example, the list of data items potentially includes a name of data item, a data type of the data item, a data size of the data item, and/or a data format of the data item. The pointer of the location indicates a file path to locate respective data item in the host file system.

In accordance with an embodiment, the system 01 further comprises one or more backup agents in the host device 02. Each of the one or more backup agents refers to a software implemented on the host device 02, which is configured to access data items and operation algorithms in the host file system and perform functions associated with backup and restore. Moreover, the one or more backup agents also acts as a communication agent or interface between the host device 02 and the backup server 04.

In an embodiment of the present disclosure the system for data backup and restore further comprises one or more backup agents, wherein the one or more backup agents is configured to: detect one or more operations executing one or more changes in the host file system; detect the one or more changes in the host file system executed by the one or more operations; and generate the data backup instruction based on the detected one or more operations and on the detected one or more change. The host device 02 is configured to activate the one or more backup agents in the host file system of the host device 02. The activating of the one or more backup agents refers to operationalizing the one or more backup agents in the host device 02 to perform various functions, such as detection of the one or more operations, the detection of the one or more changes, and generation of the data backup instruction. In an example, the one or more first operations are the operations which cause large scale changes in the host file system. The one or more backup agents is configured to detect the one or more changes by identifying changes executed by, for example, compression, encryption, filtering, and/or other operations. The generated data backup instruction indicates a sequence of steps that are required to be executed to reproduce the detected one or more changes in the one or more data items present in the host file system.

In an example, if a user decides to archive a set of file into a zip file in the host device 02, the backup server 04 stores a version of the data compression software used, the compression algorithm parameters, and a list of files the compression algorithm compressed, but it will not store the resulting compressed data. Moreover, backup server 04 is configured to store just the fact that the zip file was created and the ingredients (i.e. a backup instruction) to reproduce the zip file.

In another example, if the user encrypts a file, assuming there is trust between the user's virtual machine and the backup system, the system 01 can store just a key for the encryption and the encryption algorithm. This means that the backup server 04 will achieve better compression ratios as it can work on unencrypted data (and encrypt the data at restore time using a backup instruction that instructs use of the key for the encryption and the encryption algorithm to reproduce the encrypted file.

In yet another example, the user can apply some change to an image, such as applying a filter, followed by saving a copy of the image, as a compressed image in the host device 02. In such a case, the backup server 04 can store a pointer that indicates location of the original image, the list of filters applied and by which software the filer was applied. The backup server 04 does not store the changes or the changed image file. In some cases, for example, when the user uses a video editing tool, the tool in many cases does keep the filter list applied by the user, but such tools also allow the user to export the resultant file to a new format in the host device 02. Thus, in this case, there is no need to store the exported file in the backup server 04.

In yet another example, a patch may be installed in a virtual machine of a user in the host device 02. It is known that some patches installed can create large changes to the disk (i.e. memory of the host device 02). Thus, in such cases, the backup server 04 instead of installing the patch, stores the patch files and the instructions on how to install them.

Figure 5B:
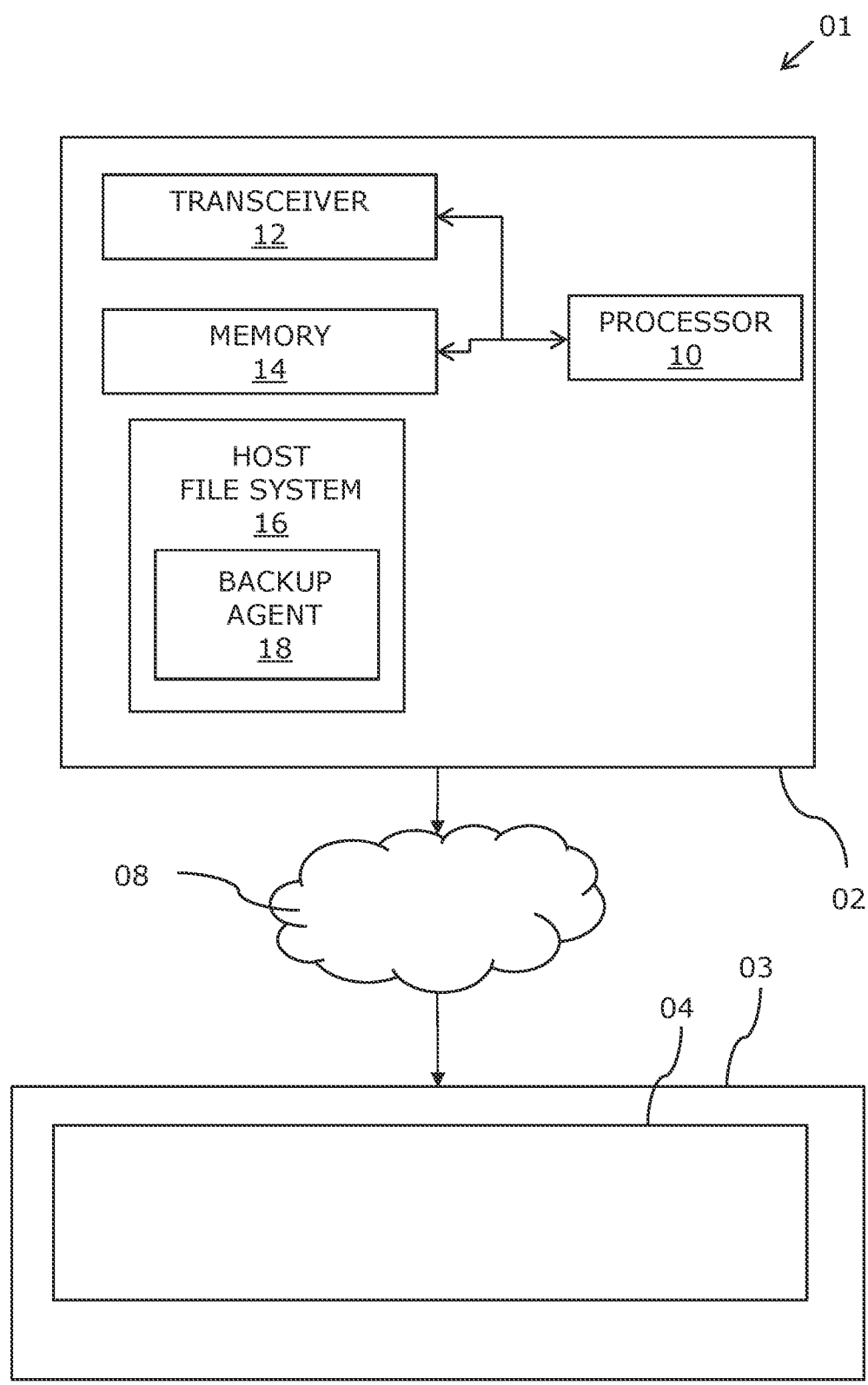
FIG. 5B is a block diagram that illustrates various exemplary components of a host device, in accordance with an embodiment of the present disclosure.

FIG. 5B is a block diagram that illustrates various exemplary components of a host device. In accordance with an embodiment of the present disclosure, the system 01 comprises the host device 02, wherein the host device 02 comprises a processor 10, a transceiver 12, and a memory 14 (e.g. a primary storage system). The processor 10 may be communicatively coupled to the transceiver 12 and the memory 14. The memory further includes a host file system 16. There is further shown a backup agent 18 in the host file system 16.

The processor 10 is configured to provide one or more data backup instructions and one or more operation algorithms to the backup server 04. In an implementation, the processor 10 is configured to execute instructions stored in the memory 14. In an example, the processor 10 may be a general-purpose processor. Other examples of the processor 10 may include, but is not limited to a microprocessor, a microcontroller, a complex instruction set computing (CISC) processor, an application-specific integrated circuit (ASIC) processor, a reduced instruction set (RISC) processor, a very long instruction word (VLIW) processor, a CPU, a state machine, a data processing unit, and other processors or control circuitry. Moreover, the processor 10 may refer to one or more individual processors, processing devices, a processing unit that is part of a machine, such as the host device 02.

The transceiver 12 includes a suitable logic, a circuitry, and one or more interfaces that may be configured to communicate with one or more external devices, such as the backup server 04. Examples of the transceiver 12 may include, but are not limited to, an antenna, a telematics unit, a radio frequency (RF) transceiver, one or more amplifiers, one or more oscillators, a digital signal processor, a coder-decoder (CODEC) chipset, and/or a subscriber identity module (SIM) card.

The memory 14 refers to a primary storage system of the host device 02. The memory 14 includes a suitable logic, a circuitry, and one or more interfaces that may be configured to store machine code and/or instructions with at least one code section executable by the processor 10. Examples of implementation of the memory 14 may include, but are not limited to, Electrically Erasable Programmable Read-Only Memory (EEPROM), Random Access Memory (RAM), Read Only Memory (ROM), Hard Disk Drive (HDD), Flash memory, Solid-State Drive (SSD), and/or CPU cache memory. The memory 14 may store an operating system and/or other program products (including one or more operation algorithms) to operate the host device 02. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

The memory 14 includes the host file system 16 and the backup agent 18. The host file system 16 comprises one or more data items to be backed up. The host file system 16 refers to a file system of the host device 02 and is associated with the process of managing the data items in the host device 02. For example, the process of managing the data item may include, but is not limited to, naming of data items in the host device, storing of data items in the host device, associating a location with the data items in the host device, and the like. The backup agent 16 refers to a software implemented on the host device that is configured to access data items (i.e. data files, data folders and the like) and perform functions associated with backup and restore. The backup agent 16 is configured to detect one or more operations executing one or more changes in the host file system 16, detect the one or more changes in the host file system 16 executed by the one or more operations; and generate one or more data backup instructions based on the detected one or more operations and the detected one or more changes.

In one aspect, in operation, the processor 10 of the host device 02 is configured to activate at least one backup agent 18 in the host file system 16 of the host device 02, the host file system 16 comprising at least one data item to be backed up. The processor 10 is further configured to use the at least one activated backup agent 18 to detect one or more first operations executing one or more changes in the host file system 16. The processor 10 is further configured to use the at least one activated backup agent 18 to detect the one or more first changes in the host file system 16 executed by the one or more first operations. The processor 10 is further configured to use the at least one activated backup agent 18 to generate a first data backup instruction based on the detected one or more first operations and on the detected one or more first changes. The processor 10 is further configured to provide one or more operation algorithms to a backup system, such as the backup server 04. The processor 10 is further configured to provide the generated first data backup instruction to the backup system, such as the backup server 04, configured for delayed backup computation of the one or more data items to be backed up. In this aspect, other operations of the processor 10 of the host device 02 correspond to the operations described, for example, in FIG. 2.

Figure 5C:
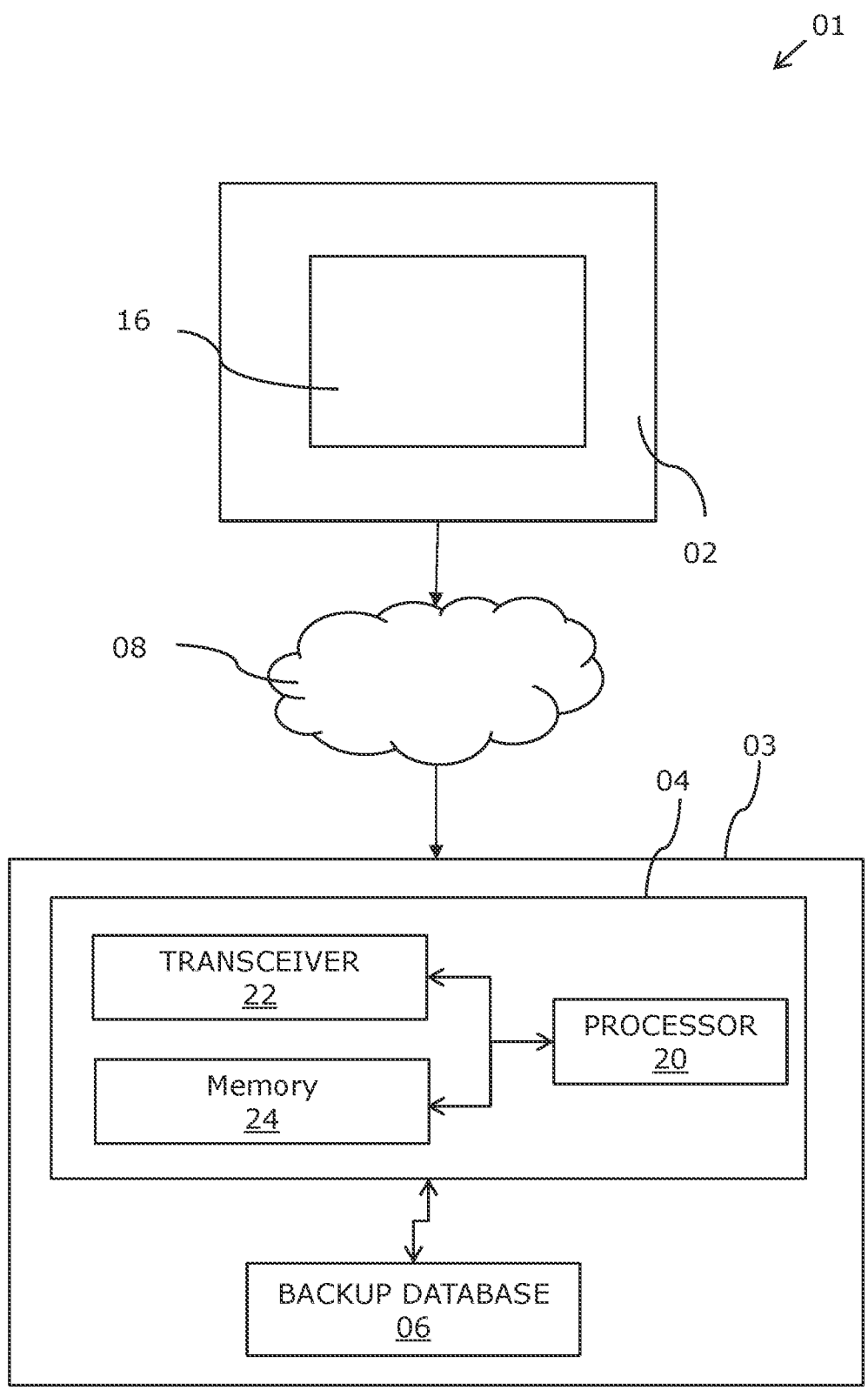
FIG. 5C is a block diagram that illustrates various exemplary components of a backup server, in accordance with an embodiment of the present disclosure.

FIG. 5C is a block diagram that illustrates various exemplary components of a backup server, in accordance with an embodiment of the present disclosure, the system 01 comprises a backup server 04. The backup server 04 comprises a processor of the backup server 20, a transceiver of the backup server 22, and a memory of the backup server 24. The processor 20 may be communicatively coupled to the transceiver 22, and to the memory 24. The memory 24 includes the backup database 06.

The processor 20 is configured to obtain one or more data backup instructions and one or more operation algorithms via the transceiver 22. In an implementation, the processor 20 is configured to execute instructions stored in the memory 24. The backup database 06 comprises a list of data items stored in the host file system 16 (FIG. 5B), and a pointer of the location of each data item in the host file system 16, or a data backup instruction for each data item in the list of data items stored in the host file system 16. Examples of the processor 20 are similar to that of the processor 10 (FIG. 5B). Similarly, examples of implementation of the transceiver 22, and the memory 24 are similar to that of the transceiver 12, and the memory 14, respectively of FIG. 5B.

In one aspect, in operation, the processor 20 of the backup server 04 is configured to receive one or more data backup instructions related to the host file system 16 of the host device 02, the host file system 16 comprising at least one data item to be backed up. The processor 20 is further configured to store the received one or more data backup instructions in a backup system, such as the backup server 04. The processor 20 of the backup server 04 is further configured to obtain one or more operation algorithms of the host device 02 and storing the obtained one or more operation algorithms as one or more restore algorithms. The processor 20 is further configured to use at least one data backup instruction of the stored one or more data backup instructions and the one or more restore algorithms to perform delayed backup computation of the data item to be backed up. In this aspect, other operations of the processor 20 correspond to the operations described, for example, in FIG. 3.

In another aspect, in operation, the processor 20 of the backup server 04 is configured to receive from the host device 02 at a restore time a restore request comprising a restore point to restore one or more data items being backed up. The processor 20 is further configured to identify from the backup database 06 a data backup instruction corresponding to the received restore request. The processor 20 is further configured to initiate at least one restore algorithm according to the restore request. The processor 20 is further configured to execute a delayed backup computation by using the identified data backup instruction and the at least one initiated restore algorithm to restore the one or more data items backed up. The processor 20 is further configured to provide the restored one or more data items to the host device 02. In this aspect, other operations of the processor 20 correspond to the operations described, for example, in FIG. 4.

In yet another aspect, various operations of the processor 20 correspond to the operations of the backup server 04 described, for example, in FIG. 5A. Alternatively stated, all the operations (or functions) executed by the backup server 04 is executable by the processor 20.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the invention, which are, for brevity, described in the context of a single embodiment, may also be provided separately or in any suitable combination or as suitable in any other described embodiment of the disclosure.

What is claimed is:

1. A method for backing up one or more data items stored in a host device, the method performed by a host file system of the host device and comprising:
   activating a backup agent of the host file system;
   detecting, using the backup agent, one or more first operations executing one or more first changes in the host file system;
   detecting, using the backup agent, the one or more first changes in the host file system executed by the one or more first operations;
   generating, using the backup agent, a first data backup instruction based on the one or more first operations and on the one or more first changes executed by the one or more first operations, the first data backup instruction including a sequence of steps to be executed in order to reproduce the one or more first changes;
   providing one or more operation algorithms to a backup system, the one or more operation algorithms for performing the one or more first operations; and
   providing the first data backup instruction to the backup system, the backup system configured for delayed backup computation of the one or more data items to be backed up based on the first data backup instruction using the one or more operation algorithms.

2. The method according to claim 1, the method further comprising:
   detecting one or more second operations, sequential to the one or more first operations, executing one or more second changes in the host file system;
   detecting the one or more second changes, sequential to the one or more first changes, in the host file system executed by the one or more second operations;
   generating a second data backup instruction based on the detected one or more second operations and on the detected one or more second changes; and
   providing the second data backup instruction to the backup system.

3. The method according to claim 1, wherein detecting one or more first changes in the host file system comprises detecting at least one of: a change in the one or more data items, one or more new data items in the host file system, a change of a location of the one or more data items in the host file system, or a deletion of the one or more data items.

4. The method according to claim 1, wherein the one or more data backup instructions comprise a restore point and at least one of:
   information of a data item of the one or more data items and information related to the change in the data item;
   information of creating a new data item;
   a type of a software and version of the software that carried out an operation in the host file system related to a change in the data item or creation of the new data item;
   information regarding what operation algorithms were used in the host file system to carry out the operation;
   one or more parameters of the used operation algorithms;
   a type of changes made in the host file system;
   a key for an encryption;
   one or more patch files; or
   an instruction for installing the one or more patch files.

5. The method according to claim 4, wherein the information of the data item comprises at least one of a fact that the data item was changed, a type of the data item, a location of the data item, a name of the data item, or a format of the data.

6. The method according to claim 4, wherein the information of the new data item comprises at least one of: a fact that the new data item was created, a type of the new data item, a location of the new data item, a name of the new data item, or a format of the new data item.

7. A system communicatively coupled to a host file system of a host device for backing up data stored in the host file system, wherein the system comprises a backup database and a backup server, wherein the backup server comprises one or more processors configured to:
   obtain one or more operation algorithms from the host device and store the obtained one or more operation algorithms in the backup database as one or more restore algorithms;
   receive one or more data backup instructions from the host file system, each respective data backup instruction is generated by the host file system by:
      activating a backup agent of the host file system;
      detecting, using the backup agent, one or more first operations executing one or more first changes in the host file system;
      detecting, using the backup agent, the one or more first changes in the host file system executed by the one or more first operations; and
      generating, using the backup agent, the respective data backup instruction based on the one or more first operations and on the one or more first changes executed by the one or more first operations, the respective data backup instruction including a sequence of steps to be executed in order to reproduce the one or more first changes; and
   initiate a delayed backup computation of one or more data items to be backed up based on the sequence of steps included in each respective data backup instruction, wherein the delayed backup computation uses the one or more operation algorithms for performing the one or more first operations.

8. The system according to claim 7, wherein one or more processors of the backup server are further configured to:
   receive, at a restore time, a restore request comprising a restore point;
   restore, at the restore time, the one or more data items of the host file system being backed up according to the received restore point by using the delayed backup computation of the one or more data items to be backed up; and provide the created one or more data items of the host file system being backed up to the host file system as a restored one or more data items.

9. The system according to claim 7, wherein the backup database comprises a list of data items stored in the host file system and:
- a pointer where a data item of the list of data items is located in the host file system; or
- a data backup instruction for each data item in the list of data items stored in the host file system.

10. A host device comprising:

an interface; and a host file system coupled to the interface, the host file system comprising a processor configured to:
- activate a backup agent of the host file system;
- detect, using the backup agent, one or more first operations executing one or more first changes in the host file system;
- detect, using the backup agent, the one or more first changes in the host file system executed by one or more first operations;
- generate, using the backup agent, a first data backup instruction based on the one or more first operations and on the one or more first changes executed by the one or more first operations, the first data backup instruction including a sequence of steps to be executed in order to reproduce the one or more first changes;
- provide one or more operation algorithms to a backup system, the one or more operation algorithms for performing the one or more first operations; and
- provide the first data backup instruction to the backup system, the backup system configured for delayed backup computation of the one or more data items to be backed up based on the first data backup instruction using the one or more operation algorithms.

11. The host device according to claim 10, wherein the processor is further configured to:
- detect one or more second operations, sequential to the one or more first operations, executing one or more second changes in the host file system;
- detect the one or more second changes, sequential to the one or more first changes, in the host file system executed by the one or more second operations;
- generate a second data backup instruction based on the detected one or more second operations and on the detected one or more second changes; and
- store the generated second data backup instruction in the backup system.

12. The host device according to claim 10, wherein the one or more data backup instructions comprise a restore point and at least one of:
- information of a data item of the one or more data items and information related to a change in the data item;
- information of creating a new data item;
- a type of a software and version of the software that carried out the operation in the host file system related to the change in the data item or creation of the new data item;
- information regarding what operation algorithms were used in the host file system to carry out the one or more first operations;
- one or more parameters of the used operation algorithms;
- a type of changes made in the host file system;
- a key for an encryption;
- one or more patch files; or
- an instruction for installing the patch files.

13. The host device according to claim 10, wherein the information of the data item comprises at least one of: a fact that the data item was changed, a type of the data item, a location of the data item, a name of the data item, or a format of the data.

14. The method according to claim 1, wherein the one or more first operations comprise one or more of a compression operation, an encryption operation, or a filtering operation.

15. The system according to claim 7, wherein the one or more first operations comprise one or more of a compression operation, an encryption operation, or a filtering operation.

16. The host device according to claim 10, wherein the one or more first operations comprise one or more of a compression operation, an encryption operation, or a filtering operation.

* * * * *